(12) United States Patent
Karnagel et al.

(10) Patent No.: US 11,520,834 B1
(45) Date of Patent: Dec. 6, 2022

(54) CHAINING BLOOM FILTERS TO ESTIMATE THE NUMBER OF KEYS WITH LOW FREQUENCIES IN A DATASET

(71) Applicant: Oracle International Corporation, Redwood Shores, CA (US)

(72) Inventors: Tomas Karnagel, Zurich (CH); Suratna Budalakoti, Belmont, CA (US); Onur Kocberber, Thalwil (CH); Nipun Agarwal, Saratoga, CA (US); Alan Wood, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/387,841

(22) Filed: Jul. 28, 2021

(51) Int. Cl.
  *G06F 16/00* (2019.01)
  *G06F 16/9035* (2019.01)

(52) U.S. Cl.
  CPC ............... *G06F 16/9035* (2019.01)

(58) Field of Classification Search
  CPC .................................................. G06F 16/9035
  See application file for complete search history.

(56) References Cited

U.S. PATENT DOCUMENTS

| | | |
|---|---|---|
| 6,226,629 B1 | 5/2001 | Cossock |
| 8,027,832 B2 | 9/2011 | Ramsey et al. |
| 10,055,506 B2 | 8/2018 | Rhodes |
| 10,534,775 B2 | 1/2020 | Moerkotte et al. |
| 10,635,671 B2 | 4/2020 | Sheng et al. |
| 10,678,792 B2 | 6/2020 | Ziauddin et al. |
| 10,853,362 B2 | 12/2020 | Qin et al. |
| 10,983,976 B2 | 4/2021 | Qin |
| 11,074,534 B2 | 7/2021 | Piccicuto et al. |
| 11,157,471 B2 | 10/2021 | P et al. |
| 11,176,487 B2 | 11/2021 | Varadarajan et al. |

(Continued)

FOREIGN PATENT DOCUMENTS

WO   WO 2018/222580   12/2018

OTHER PUBLICATIONS

Wikipedia, "Bloom Filter", https://en.wikipedia.org/wiki/Bloom_filter, edited Jul. 5, 2021, 23pgs.

(Continued)

*Primary Examiner* — Ajith Jacob
(74) *Attorney, Agent, or Firm* — Hickman Becker Bingham Ledesma LLP

(57) ABSTRACT

Techniques are described for generating an approximate frequency histogram using a series of Bloom filters (BF). For example, to estimate the f1 and f2 cardinalities in a dataset, an ordered chain of three BFs is established ("BF1", "BF2", and "BF3"). An insertion operation is performed for each datum in the dataset, whereby the BFs are tested in order (starting at BF1) for the datum. If the datum is represented in a currently-tested BF, the subsequent BF in the chain is tested for the datum. If the datum is not represented in the currently-tested BF, the datum is added to the BF, a counter for the BF is incremented, and the insertion operation for the current datum ends. To estimate the cardinality of f1-values in the dataset, the BF2-counter is subtracted from the BF1-counter. Similarly, to estimate the cardinality of f2-values in the dataset, the BF3-counter is subtracted from the BF2-counter.

20 Claims, 5 Drawing Sheets

(56) References Cited

U.S. PATENT DOCUMENTS

| | | | |
|---|---|---|---|
| 11,256,698 | B2 | 2/2022 | Idicula et al. |
| 11,303,545 | B2 | 4/2022 | Kumar et al. |
| 11,321,317 | B2 | 5/2022 | Su et al. |
| 11,347,736 | B2 | 5/2022 | McConnell |
| 11,379,450 | B2 | 7/2022 | Fender et al. |
| 2008/0086444 | A1 | 4/2008 | Yu et al. |
| 2008/0306903 | A1 | 12/2008 | Larson et al. |
| 2009/0006380 | A1 | 1/2009 | Agrawal et al. |
| 2009/0006431 | A1 | 1/2009 | Agrawal et al. |
| 2009/0228433 | A1 | 9/2009 | Aguilar Saborit et al. |
| 2014/0122921 | A1* | 5/2014 | Imamichi .......... G06F 17/30321 714/6.2 |
| 2018/0341678 | A1 | 11/2018 | Moerkotte et al. |
| 2019/0102427 | A1 | 4/2019 | Chakkappen et al. |
| 2019/0236474 | A1 | 8/2019 | Smith et al. |
| 2019/0256924 | A1 | 8/2019 | Vogelstein et al. |
| 2020/0340064 | A1 | 10/2020 | Gross et al. |
| 2020/0377956 | A1 | 12/2020 | Vogelstein et al. |
| 2021/0089533 | A1 | 3/2021 | Chen |
| 2021/0365805 | A1 | 11/2021 | Karnagel et al. |
| 2022/0091130 | A1 | 3/2022 | Marcotte et al. |
| 2022/0253425 | A1 | 8/2022 | Budalakoti |

OTHER PUBLICATIONS

Su et al. "Approximate Aggregates in Oracle 12C", CIKM'16, dated Oct. 24-28, 2016, Indianapolis, IN, USA, ACM, 10 pages.

Raab, M., et al., "Balls into Bins—A Simple and Tight Analysis", In: Randomization and Approximation Techniques in Computer Science. RANDOM '98, LNICS, vol. 1518. Springer, (https://doi.org/10.1007/3-540-49543-6_13) 1998, 12pgs.

O'Neill, Ben, "The Classical Occupancy Distribution: Computation and Approximation", The American Statistician, https://doi.org/10.1080/00031305.2019.1699445, Dec. 19, 2019, 13pgs.

Mitzenmacher, M., et al., "The Power of Two Random Choices: A Survey of Techniques and Results", In Handbook of Randomized Computing, 2001, pp. 255-312, 60pgs.

Heule et al., "HyperLogLog in Practice: Algorithmic Engineering of a State of The Art Cardinality Estimation Algorithm", EDBT/ICDT'13, Mar. 18-22, 2013, Genoa, Italy Copyright 2013 ACM, 10 pages.

Haas et al., "Sampling-Based Estimation of the Number of Distinct Values of an Attribute", Proceedings of the 21st VLDB Conference, dated 1995, 12 pages.

Flajolet et al., "HyperLogLog: the analysis of a near-optimal cardinality estimation algorithm", dated 2007 Conference on Analysis of Algorithms, 22 pages.

Charikar, et al., "Towards Estimation Error Guarantees for Distinct Values", Proceedings of the nineteenth ACM SIGMOD-SIGACT-SIGART symposium on Principles of database systems dated May 2000.

Chakkappen, et al, "Efficient and Scalable Statistics Gathering for Large Databases in Oracle 11g", Proceedings of the 2008 ACM SIGMOD international conference on Management of data, Jun. 2008, 11pgs.

Burnham, K. P. et al., "Es- timation of the Size of a Closed Population when Capture Probabilities Vary Among Animals", Biometrika 65, vol. 65, Issue 3, Dec. 1978, pp. 625-633.

Azar, Yossi, et al., "Balanced Allocations", Proc. of 26th STOC (1994), 593-602, 180-200, https://www.cs.tau.ac.il/~azar/box.pdf, 30pgs.

Ahmed et al., "Automated Generation of Materialized Views in Oracle", Proceedings of the VLDB Endowment, vol. 13, No. 12, dated Aug. 2020, 13 pages.

Agarwal, Nipun, "MySQL Analytics Service", Oracle Labs, dated 2019, 22 pages.

Karnagel, U.S. Appl. No. 16/877,882, filed May 19, 2020, Non-Final Rejection dated Sep. 2, 2022.

Budalakoti, U.S. Appl. No. 17/168,459, filed Feb. 5, 2021, Notice of Allowance and Fees Due dated Aug. 31, 2022.

Papapetrou et al., "Cardinality Estimation and Dynamic Length Adaptation for Bloom Filters", Springer Science+Business Media, DOI: 10.1007/s10619-010-7067-2, dated Sep. 2, 2010, 38 pages.

* cited by examiner

| ITERATION 302 | INPUT KEY 304 | FILTER 120 (BF1) 306 | CNT1 308 | FILTER 130 (BF2) 310 | CNT2 312 | FILTER 140 (BF3) 314 | CNT3 316 |
|---|---|---|---|---|---|---|---|
| 0 | - | - | 0 | - | 0 | - | 0 |
| 1 | 1 | 1 | 1 | - | 0 | - | 0 |
| 2 | 2 | 1,2 | 2 | - | 0 | - | 0 |
| 3 | 1 | 1,2 | 2 | 1 | 1 | - | 0 |
| 4 | 3 | 1,2,3 | 3 | 1 | 1 | - | 0 |
| 5 | 4 | 1,2,3,4 | 4 | 1 | 1 | - | 0 |
| 6 | 6 | 1,2,3,4,6 | 5 | 1 | 1 | - | 0 |
| 7 | 3 | 1,2,3,4,6 | 5 | 1,3 | 2 | - | 0 |
| 8 | 2 | 1,2,3,4,6 | 5 | 1,3,2 | 3 | - | 0 |
| 9 | 1 | 1,2,3,4,6 | 5 | 1,3,2 | 3 | 1 | 1 |
| 10 | 5 | 1,2,3,4,6,5 | 6 | 1,3,2 | 3 | 1 | 1 |
| 11 | 3 | 1,2,3,4,6,5 | 6 | 1,3,2 | 3 | 1,3 | 2 |
| 12 | 1 | 1,2,3,4,6,5 | 6 | 1,3,2 | 3 | 1,3 | 2 |

CHAINING BLOOM FILTERS TO ESTIMATE THE NUMBER OF KEYS WITH LOW FREQUENCIES IN A DATASET

CROSS-REFERENCE TO RELATED APPLICATIONS

This application is related to U.S. patent application Ser. No. 16/877,882, titled "Estimating Number Of Distinct Values In A Data Set Using Machine Learning", filed May 19, 2020, and to U.S. patent application Ser. No. 17/168,459, titled "Approximate Estimation Of Number Of Distinct Keys In A Multiset Using A Sample", filed Feb. 5, 2021, the entire contents of each of which is hereby incorporated by reference as if fully set forth herein.

FIELD OF THE INVENTION

Techniques described herein relate to database management, and more specifically, to efficiently gathering data required to estimate the number of distinct values within a particular dataset.

BACKGROUND

The number of distinct values (NDV) in a dataset is needed in many cases, such as for database query optimization, optimizing hash table creation, and optimizing dictionary creation (e.g., allocating the right size of dictionary).

A naïve approach to determining the NDV of a dataset (e.g., values in a particular column of a database table) involves scanning the full dataset to identify the NDV. For columns with millions or billions of rows, this approach is not practical due to time, computing resource, and space constraints.

A less computationally-expensive approach is to estimate the NDV of a dataset. Generally, most NDV estimation techniques use frequency statistics, also referred to herein as a "frequency histogram", of keys in a random sample of a dataset to arrive at an estimated NDV for the dataset. A frequency histogram shows the frequency distribution of keys in a target dataset, and can be represented as a set of key-value pairs. The key represents a distinct frequency, and the value represents the number of keys in the sample having that frequency. For example, the frequency histogram: {1:100, 2:70, 100:1} indicates that the target dataset has 100 keys occurring exactly once in the dataset ("f1"), 70 keys occurring exactly twice in the dataset ("f2"), and one key occurring exactly 100 times in the dataset ("f100"). A commonly used alternate notation to represent a frequency histogram is to say that f1=100, f2=70, f100=1.

Depending on the size of the target dataset, computing a frequency histogram for the dataset can be time- and memory-intensive, and many times represents the chief bottleneck in the NDV estimation process. The high resource usage of frequency histogram generation also limits the size of the target dataset on real-world systems, which impacts the quality of the resulting NDV estimate.

For example, the intuitive approach to compute a frequency histogram for a database column (e.g., column_x in table_x) is shown using the following SQL Query 1, where table_x represents either a whole table residing in a database or a sample of such a table:

Query 1:
  SELECT frequency, count(*) as n keys
  FROM
    SELECT column_x, count(*) as frequency
    FROM table_x
    GROUP BY column_x)
  GROUP BY frequency;

This approach to computing a frequency histogram has multiple downsides. For example, two GROUP BY operators are needed in Query 1, which internally create two hash tables. If column_x contains only unique keys, then the hash table of the inner GROUP BY operation has the same number of entries as table_x. For many database systems, including MySQL, a large input table and a large inner hash table for a GROUP BY operation might go beyond system limits on temporary data. Thus, the size of table_x is limited for this technique to avoid failure during execution of Query 1.

Furthermore, Query 1 can only be executed on one column at a time; it is not possible to write a single query that returns the frequency histogram for multiple columns of table_x in one pass. Thus, each column that requires NDV estimation for a given application requires separate processing, and greatly increases the overall cost of NDV estimation for the application.

Also, Query 1 computes the frequency histogram for all of the frequencies observed in column_x, while lower order frequencies (f1 and f2 being the most critical) generally have the largest impact on NDV estimation. Thus, computing the whole frequency histogram, including high frequency values, adds unnecessary computational overhead. It is noted that the SQL implementation of Query 1 is illustrative, and the issues with the approach described using Query 1 are not limited to SQL implementations.

It would be beneficial to efficiently generate a frequency histogram for a target dataset such that the size of the target dataset need not be limited, and multiple datasets may be concurrently analyzed to generate frequency histograms.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

DETAILED DESCRIPTION

Figure 1:
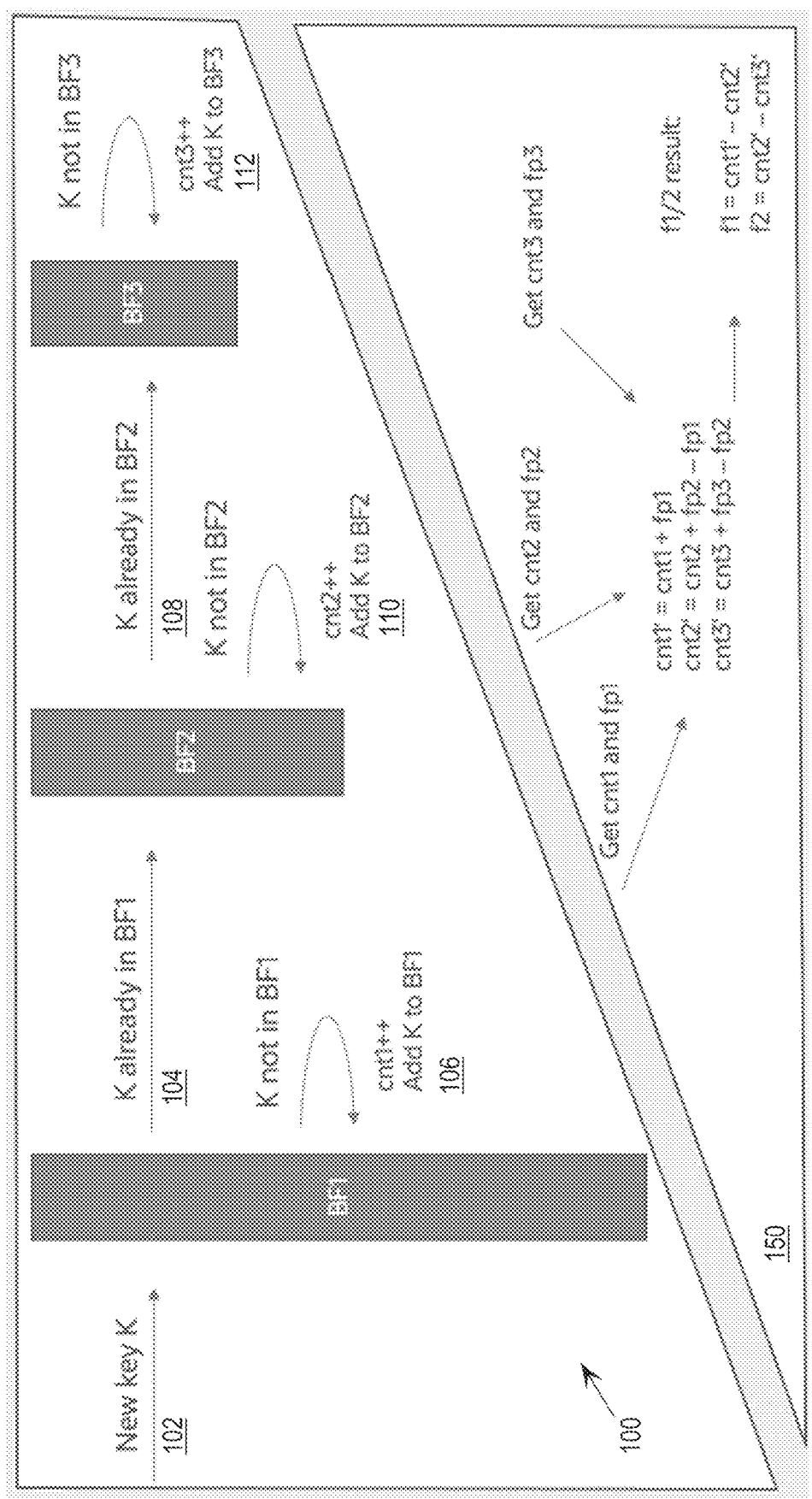
FIG. 1 depicts a Bloom filter series insertion operation, which is applied to values in a target dataset to generate an approximate frequency histogram the dataset.

In the following description, for the purposes of explanation, numerous specific details are set forth in order to provide a thorough understanding of techniques described herein. It will be apparent, however, that techniques described herein may be practiced without these specific details. In other instances, well-known structures and devices are shown in block diagram form in order to avoid unnecessarily obscuring the described techniques.

1. General Overview

Techniques are described herein for generating an approximate frequency histogram, e.g., for use in estimating the NDV of a particular dataset. All in all, computing the whole and exact frequency histogram for NDV estimation is inefficient, especially given that the workflow of NDV prediction for target data contains the following steps: (1) take a random sample of the target data, which, being random, generally introduces some error; (2) compute a frequency histogram for the sample; and (3) estimate the NDV of the target data based on the frequency histogram, which, being an estimate, generally introduces some additional error. Thus, the introduction of a small amount of error by using an approximate frequency histogram, rather than an exact frequency histogram, to estimate NDV is generally negligible in light of the error already present in the NDV estimation process.

In general, the counts of values having low frequencies, such as f1 and f2, are the most important statistics for NDV estimation. Accordingly, techniques are described herein for generating an approximate frequency histogram using a series of "chained" Bloom filters to estimate lower-frequency value cardinalities within a target dataset. For example, to estimate the f1 and f2 cardinalities in a particular dataset (e.g., a sample of a particular table column), an ordered chain of three Bloom filters is established, referred to herein as "BF1", "BF2", and "BF3". A Bloom filter series insertion operation is performed for each data point in the dataset, whereby the Bloom filters are tested in order (starting at BF1) to determine if the data point is represented in the Bloom filter chain. If the data point is represented in a currently-tested Bloom filter, the subsequent Bloom filter in the chain (if applicable) is tested for the data point. If the data point is not represented in the currently-tested Bloom filter, the data point is added to the Bloom filter, a counter associated with the Bloom filter is incremented, and the insertion operation for the current data point is terminated.

After performing the insertion operation on all of the data points in the target dataset, the counter associated with BF1 ("cnt1") represents an estimate of the cardinality of distinct values in the dataset, the counter associated with BF2 ("cnt2") represents an estimate of the cardinality of distinct values in the dataset having at least a frequency of two, and the counter associated with the BF3 ("cnt3") represents an estimate of the cardinality of distinct values in the dataset having at least a frequency of three. To estimate the cardinality of f1 values in the dataset, cnt2 is subtracted from cnt1. Similarly, to estimate the cardinality of f2 values in the dataset, the cnt3 is subtracted from the cnt2.

Because Bloom filters are probabilistic data structures that are likely to produce false positive results when tested, the accuracy of the resulting approximated frequency histogram is enhanced by estimating a number of false positive errors that occurred during Bloom filter population and adjusting the resulting counts based on the estimated numbers of false positive errors for the series of Bloom filters. Thus, according to some embodiments, to adjust for false positive errors that occurred during population of the Bloom filters, the number of false positive errors for a given Bloom filter is modeled as an "Occupancy Problem". In this way, the number of false positive errors for a given Bloom filter may be derived based on (a) a value of the counter associated with the Bloom filter, (b) a total number of bits in the Bloom filter, and (c) a number of set bits in in Bloom filter, without requiring calculation of the changing rate of false positive errors throughout population of the Bloom filter.

Techniques described herein do not limit the size of the target dataset for NDV estimation because Bloom filters have a fixed memory footprint, and as such, the memory footprint of intermediate data for the Bloom filter-based techniques does not grow during frequency histogram estimation. Furthermore, the amount of memory allocated for the Bloom filters may be further optimized based on the known cardinality of the dataset being analyzed, which further reduces the memory footprint of techniques described herein. Also, updating Bloom filters and counters are very low-cost, and these operations do not require large amounts of memory. Thus, the computing cost of generating an approximate frequency histogram is significantly less than the cost of generating an exact frequency histogram.

Furthermore, using techniques described herein, approximate frequency histograms may be concurrently generated for multiple datasets, thereby reducing the overall runtime needed to generate multiple NDVs for a given application. For example, a User Defined Function (UDF) in a database system may be used to implement generation of approximate frequency histograms, which facilitates processing multiple columns at once (in one pass). In this way, techniques described herein improve runtime and usability of NDV estimation-based applications that rely on frequency histograms.

The NDVs of datasets that are involved in a query may be used by query optimization to generate efficient query execution plans and the efficient computation of NDVs speeds up identification of query execution plans. Nevertheless, cardinality estimation may be a discretionary activity that a query optimizer may forgo if a cost-benefit analysis is unfavorable. Decreased latency in NDV estimation using approximate frequency histograms means decreased cost in a cost-benefit analysis such that NDV estimation can be justified more often. For example, NDV estimation may have too high a cost based on using exact frequency histogram generation, which may cause the query optimizer to forgo cardinality estimation in marginal cases. Herein the tension between cost and benefit may become favorable for those same marginal cases.

Further, accurate estimation of NDVs results in more useful information for the query optimizer. Likewise, accurate estimation of NDVs facilitates decreased cost of query execution such as by avoiding occurrences when an inaccurate NDV estimate causes maintenance activities that are blocking and expensive in time and space, e.g., rehashing, rebalancing, or reallocating that may entail excessive copying of data in a data structure. Techniques described herein facilitate avoidance of such expensive maintenance activities.

2. Bloom Filter

A Bloom filter is a probabilistic data structure that is used to track occurrence of particular values within a dataset. According to some embodiments, a Bloom filter is implemented by a list of bits with a certain length (lenBits, e.g., 1M bits), where all bits are initialized to 0. For every new value, a hash function (H1) is used to identify a position in the Bloom filter for the value, e.g., position=H1(value) % lenBits. If the bit at this position is already set to 1, it is assumed that the value has already been added to the Bloom filter. If the bit at this position is set to 0, the value was definitely not added before, and the value is added to the Bloom filter by setting the bit at the determined position to 1.

If a hash function maps two distinct values to the same position within the Bloom filter (collision), a first of the two values may be added to the Bloom filter and when the same position is checked in connection with the second value, it will erroneously be assumed that the second value was already added to the filter. In this scenario, a false positive error occurred for the second value. To reduce the probability of false positive errors, multiple (N) hash functions can be used (H1, H2, . . . HN) for the Bloom filter. In the multi-hash embodiment, N bits are set to 1 upon adding a value to the Bloom filter, one bit for each position resulting from applying one of the hash functions to the value. Therefore, a value is determined to be present in the Bloom filter when bits at all of the positions corresponding to the value are set. Any number of hash functions may be used for the Bloom filters, according to embodiments.

3. Generating an Approximate Frequency Histogram Using A Series of Bloom Filters To generate an approximate frequency histogram, a series of "chained" Bloom filters are used to estimate key portions (i.e., the lower-frequency cardinalities) of a frequency histogram instead of exactly computing the frequency histogram. Specifically, a target dataset (e.g., a random sample of a database table column) is traversed, and the number of elements that occur a certain number of times (1, 2, . . . , X times) is estimated. To estimate cardinalities of values having the frequencies f1 through fX (X being an arbitrary number), techniques described herein use a chained series of X+1 Bloom filters. A Bloom filter that uses multiple hash functions is more accurate than a Bloom filter that uses a single hash function, but the number of elements added to the filter is not derivable from the bits of the filter. Thus, for techniques described herein, each Bloom filter (at index i) in the series of Bloom filters is associated with a counter (cnti).

FIG. 1 depicts a Bloom filter series insertion operation 100 using a series of chained Bloom filters BF1, BF2, and BF3, which is applied to values in a target dataset to generate an approximate frequency histogram, including frequencies f1 and f2 (i.e., X=2), for the dataset. The value of X used for example insertion operation 100 is non-limiting, and any number of frequencies may be included in an approximate frequency histogram generated using techniques described herein.

Figure 2:
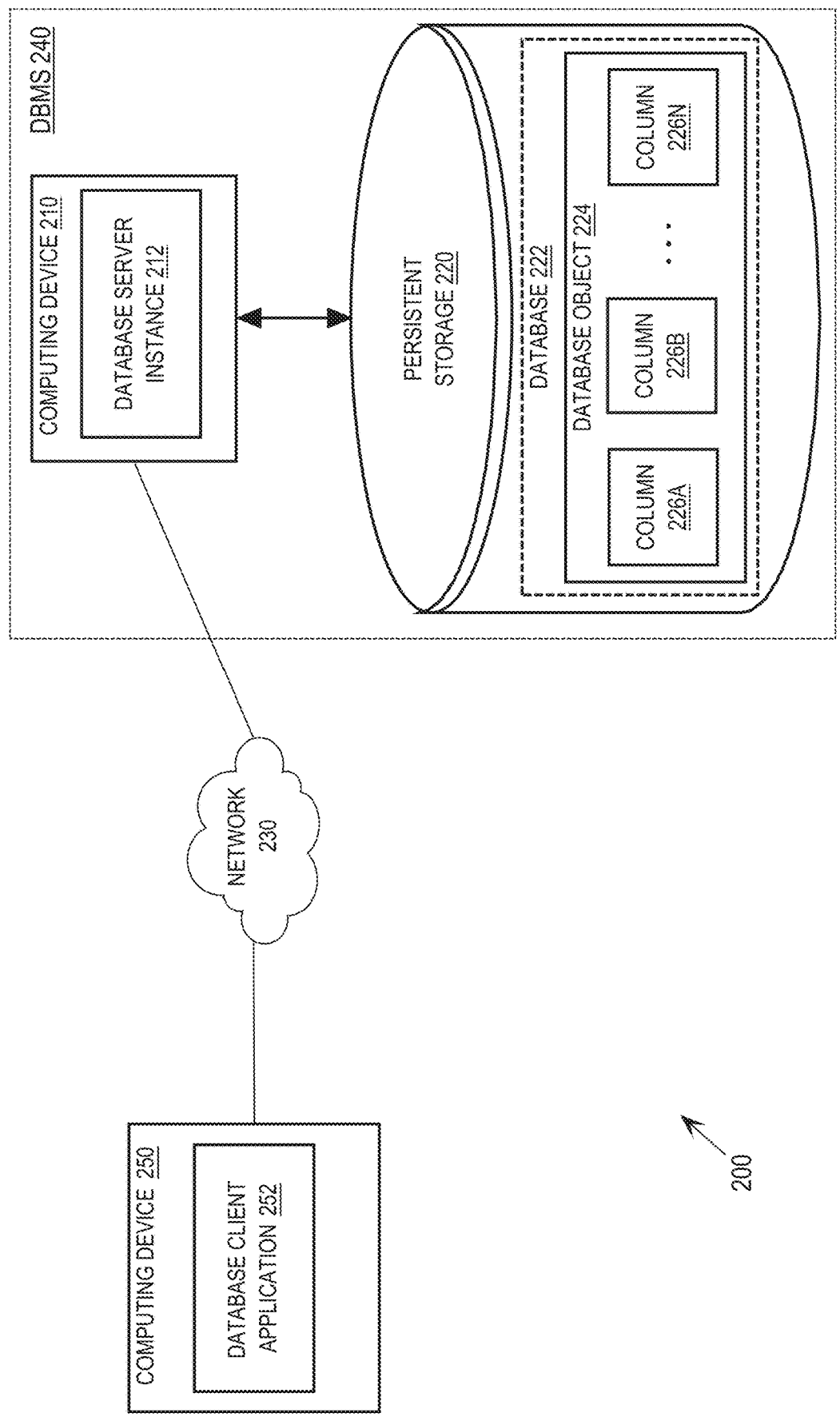
FIG. 2 depicts an example network arrangement.

FIG. 2 depicts an example network arrangement 200 that includes a computing device 210 and a computing device 250 communicatively coupled via a network 230. Computing device 250 runs a database client application 252. Further, computing device 210 runs a database server instance 212 and is communicatively coupled to persistent storage 220 storing a database 222, which are part of a database management system (DBMS) 240. Techniques for generating an approximate frequency histogram are described herein as being implemented by instance 212 as an illustrative example. Nevertheless, techniques for generating an approximate frequency histogram may be implemented in any way, including as a user-defined function accessible at instance 212, in database code that defines instance 212, as a part of an automation/monitoring system in DBMS 240, etc.

To illustrate insertion operation 100 of FIG. 1, database server instance 212 receives, from database client application 252, a request to generate an approximate frequency histogram, with X=2, for a particular column of a particular table. For example, the request is to run the following SQL query with a user-defined function "approx_freq_hist" that implements techniques for generating an approximate frequency histogram described herein, and takes, as parameters, an identifier of a table column storing the target dataset and the desired X value:

SELECT approx_freq_hist(column_226A, 2)
FROM database_object_224

In this example, column 226A includes a sample of a dataset for which an NDV estimation operation is to be performed.

To generate an approximate frequency histogram, with X=2, for values of the target dataset, instance 212 initializes X+1 Bloom filters in memory. Instance 212 runs insertion operation 100, using BF1, BF2, and BF3 (in order), for each value in column 226A. The following algorithm further illustrates insertion operation 100:

Input: new key k
    If k not in BF1: #test if k was not added before (testing N
      bits for N hash #functions)
      BF1.add(k) #add k to BF1 (set N bits to 1 using N hash
        functions)
      cnt1++#increment counter for BF1
    else: #k is already in BF1 and go to BF2
      If k not in BF2:
        BF2.add(k)
        cnt2++
      else: #k is already in BF2 and go to BF3
        If k not in BF3:
          BF3.add(k)
          cnt3++

This algorithm can be run linearly for every value in the target dataset without any intermediate data except the Bloom filters and counters. Accordingly, the memory required is static, and estimation of frequency counts will not overrun available memory.

Figure 3:
FIG. 3 depicts iterations of a Bloom filter series insertion operation over example target dataset values.

To further illustrate insertion operation 100, FIG. 3 depicts a table 300, where each row illustrates an iteration of the insertion operation. Each row in table 300 includes an iteration number in column 302, an input key in column 304, values represented in the series of Bloom filters after the current iteration in columns 306, 310, and 314, as well as values of counters associated with the series of Bloom filters after the current iteration in columns 308, 312, and 316. The example iterations performed by instance 212 are described below:

0. Before any input keys are processed, BF1, BF2, and BF3 are initialized and empty, and the counters for each filter are initialized to 0.
1. At step 102, the input key is '1', which is not found in BF1. Thus, at step 106, '1' is added to BF1 and cnt1 is incremented.
2. At step 102, the input key is '2', which is not found in BF1. Thus, at step 106, '2' is added to BF1 and cnt1 is incremented.
3. At step 102, the input key is '1', which is found in BF1 at step 104. Thus, it is determined whether '1' is found in BF2, which is not the case. Accordingly, at step 110, '1' is added to BF2 and cnt2 is incremented.

4. At step 102, the input key is '3', which is not found in BF1. Thus, at step 106, '3' is added to BF1 and cnt1 is incremented.
5. At step 102, the input key is '4', which is not found in BF1. Thus, at step 106, '4' is added to BF1 and cnt1 is incremented.
6. At step 102, the input key is '6', which is not found in BF1. Thus, at step 106, '6' is added to BF1 and cnt1 is incremented.
7. At step 102, the input key is '3', which is found in BF1 at step 104. Thus, it is determined whether '3' is found in BF2, which is not the case. Accordingly, at step 110, '3' is added to BF2 and cnt2 is incremented.
8. At step 102, the input key is '2', which is found in BF1 at step 104. Thus, it is determined whether '2' is found in BF2, which is not the case. Accordingly, at step 110, '2' is added to BF2 and cnt2 is incremented.
9. At step 102, the input key is '1', which is found in BF1 at step 104 and in BF2 at step 108. However, '1' is not in BF3; thus, at step 112, '1' is added to BF3 and cnt3 is incremented.
10. At step 102, the input key is '5', which is not found in BF1. Thus, at step 106, '5' is added to BF1 and cnt1 is incremented.
11. At step 102, the input key is '3', which is found in BF1 at step 104 and in BF2 at step 108. However, '3' is not in BF3; thus, at step 112, '3' is added to BF3 and cnt3 is incremented.
12. At step 102, the input key is '1', which is found in BF1 at step 104 and in BF2 at step 108. Because '1' is also found in BF3, no further action is taken for this iteration.

After running insertion operation 100 for every value in the target dataset, cnt1 records an estimate of all values that occur one or more times in the dataset, cnt2 records an estimate of all values that occur two or more times in the dataset, and cnt3 records an estimate of all values that occur three or more times in the dataset. To calculate the values for the approximate frequency histogram, instance 212 calculates f1=cnt1−cnt2 (in the example of FIG. 3, f1=3), and f2=cnt2− cnt3 (in the example of FIG. 3, f2=1).

According to some embodiments, these values are stored in memory, e.g., at computing device 210 and/or in persistent storage 220. According to some embodiments, these values are returned to database client application 252 as a response to a request for an approximate frequency histogram.

4. Allocating Memory for the Bloom Filters

A good rule of thumb is that a Bloom filter is initialized to contain eight times more bits than the most entries that might be added to the filter. Thus, for a target dataset size of 10M (million) rows, a Bloom filter configured to track the dataset is initialized to include 80M bits=10 MB (megabytes). A Bloom filter size that is based on this calculation is referred to herein as the "target" filter size. For the example implementation of X=2 with three Bloom filters, using the target filter size for the three required Bloom filters would result in a space requirement for frequency histogram estimation of 30 MB per target dataset.

As an optimization, the sizes of all Bloom filters with indexes greater than one are reduced. This can be explained when looking at the worst-case scenarios for the Bloom filters in the series, which are described below (assuming a dataset size of 10M values):

For BF1, the worst case would be 10M unique values leading to 10M inserts to BF1, no inserts to BF2, and no inserts to BF3. Because it is possible that BF1 will be required to hold a number of values equal to the cardinality of the target dataset, the size of BF1 is based on 10M values, e.g., 10 MB.

For BF2, the worst case would be if every value in the target dataset occurs exactly twice, which maximizes the number of inserts in BF2 to ½ *10M, leading to 5M entries in BF1 (unique values), 5M entries in BF2, and no entries in BF3. Because it is possible that BF2 will be required to hold a number of values equal to half of the cardinality of the target dataset, the size of BF2 is based on 5M values, e.g., 5 MB.

Similarly, for BF3, the worst case would be if every value in the target dataset occurs exactly three times, which maximizes the number of inserts in BF3 to ⅓ *10M, leading to 3.3M entries in BF1, 3.3M entries in BF2, and 3.3M entries in BF3. Because it is possible that BF3 will be required to hold a number of values equal to one-third of the cardinality of the target dataset, the size of BF2 is based on 3.3M values, e.g., 3.3 MB.

As shown above, the memory space required for each Bloom filter can be determined by dividing the target Bloom filter size by the associated Bloom filter index (i=1, 2, 3, etc.). Thus, the space requirement for the Bloom filters is improved from $$X+1 * target\_BF\_size$$

to:

$$\sum_{i=1}^{X+1} \frac{target\_BF\_size}{i}$$

As a result, the overall size of the series of Bloom filters used to generate an approximate frequency histogram is greatly reduced. To illustrate, given the example of 10M values in the dataset, the space requirement is reduced from 30 MB to 18.3 MB, which is a 39% improvement.

5. Concurrent Frequency Histogram Estimation

Multiple frequency histograms may be generated concurrently using techniques described herein. For example, the following query using a user-defined function is executed by instance 212 to concurrently generate estimated histograms for columns 226A, 226B, and 226C in database object 224 (FIG. 2):

SELECT approx_freq_hist(column 226A, 2),
  approx_freq_hist(column 226B, 2),
  approx_freq_hist(column 226C, 2)
FROM database_object 224

Instance 212 initializes a respective series of Bloom filters for each target dataset. For this example query, instance 212 pulls values for each of the columns a row at a time, and performs insertion operation 100 for each column using the respective series of Bloom filters. Concurrent generation of multiple approximate frequency histograms is not limited to datasets found within the same database object.

6. False Positive Errors

FIG. 1 further depicts, in section 150, techniques for false positive correction, according to some embodiments. False positive errors can greatly impact the approximate frequency histogram generated according to embodiments in that each false positive for a given Bloom filter not only affects the count from that Bloom filter, but also affects the count of the downstream Bloom filter.

However, estimation of false positive errors for a Bloom filter is complicated by the fact that the probability of a false positive test changes throughout populating the Bloom filter. Furthermore, instead of populating the Bloom filters during a build phase and then testing the Bloom filters in a subsequent test phase, embodiments base insertions into the Bloom filters on tests of what is currently represented in the series of Bloom filters.

According to some embodiments, to adjust for false positive errors that occurred during population of the Bloom filters, the number of false positive errors for a given Bloom filter is modeled as an "Occupancy Problem", which is a category of problems involving random pairing of two different kind of objects (often visualized as randomly assigning balls to bins). To illustrate, the Occupancy Problem posits throws of an undisclosed number of balls randomly landing into a known number of bins resulting in a known number of occupied bins and a known number of unoccupied bins. The total number of throws is then derived from the known numbers of occupied and unoccupied bins. (For additional information on the "Occupancy Problem", see Ben O'Neill, "The Classical Occupancy Distribution: Computation and Approximation", The American Statistician, DOI: 10.1080/00031305.2019.1699445, 19 Dec. 2019, the contents of which is incorporated by reference as if fully set forth herein.)

In the case of a Bloom filter described herein, an unknown total number of values should have been included in the Bloom filter (which corresponds to the unknown number of throws), and a known number of bits are set and a known number of bits are unset as a result of attempting to include the unknown total number of values in the Bloom filter (which corresponds to the known number of occupied bins). Modeling the problem as an Occupancy Problem, the number of false positive errors for a given Bloom filter can be derived based on (a) a value of the counter associated with the Bloom filter, (b) a total number of bits in the Bloom filter, and (c) a number of set bits in in Bloom filter, without requiring calculation of the changing rate of false positive errors throughout population of the Bloom filter.

6.1. Problem Definition

Let the Bloom filter size be N. Let the number of hash functions used during Bloom filter population be h. Let the (unknown) number of distinct keys that were attempted to be added to the Bloom filter during filter population be k. Let the number of bits set in the Bloom filter at the end of filter population be s. The goal of this calculation is to estimate k, as the number of false positive errors can be derived from k.

Out of the k distinct keys that were added to the Bloom filter, a subset of keys (c) were correctly added to the Bloom filter, because they were not found to be already added. The rest of the k keys are false positives, which were wrongly rejected as already having been added to the Bloom filter. Let the number of such keys be f_pos. Then k=c+f_pos, where c is the number of keys added correctly to the Bloom filter, as recorded by the counter associated with the Bloom filter. The goal below is to calculate k, as f_pos can then be calculated as f_pos=k−c.

6.2. Calculating False Positive Errors

For h=1, the number of balls thrown gives us k. For other values of h, k can be estimated as $$k = \frac{\text{Number of Balls Thrown}}{h}.$$

It is assumed herein that multiple hash functions (e.g., two) are used to populate the Bloom filters.

For a bit $b_i$ in the Bloom filter, i=1 . . . N, the probability that the bit is not set to 1 (or that the bin that the bit represents is empty), is equal to the probability that each of the h*k bits set during population of the Bloom filter was one of the other N−1 keys. This probability can be written as:

$$P[b_i = 0] = \left(\frac{N-1}{N}\right)^{hk} = \left(1 - \frac{1}{N}\right)^{hk}$$

Then the probability that a bit $b_i$ in the Bloom filter is set to 1 (or that the bin that the bit represents is populated), can be written as:

$$P[b_i = 1] = 1 - \left(1 - \frac{1}{N}\right)^{hk}$$

Given that there are N such bits, the expected number of bits set is given by the following formula:

$$E\left[\sum_{i=1}^{N} b_i\right] = N\left(1 - \left(1 - \frac{1}{N}\right)^{hk}\right) = N - N\left(1 - \frac{1}{N}\right)^{hk}$$

Equating the expected number of bits set to the observed number of bits set (s) gives:

$$N - N\left(1 - \frac{1}{N}\right)^{hk} = s$$

Solving for k gives:

$$k = \frac{\log\left(1 - \frac{s}{N}\right)}{h \cdot \log\left(1 - \frac{1}{N}\right)}$$

Then f_pos can be estimated as f_pos=k−c. Since, due to sampling error, f_pos can occasionally be less than 0, f_pos is set as follows:

f_pos=max(0,k−c)

To illustrate using example data, 10M values are present in the target dataset, X=2, the number of hashes (h) is 2. After performing insertion operation 100 (FIG. 1) for each value in the target dataset, instance 212 calculates the false positive errors for each Bloom filter in the series of Bloom filters.

For BF1, the number of bits (N) is 80M, the number of set bits (s) is 14.75M, and cnt1=8M. Thus, the false positive calculations for BF1 are as follows (with numbers in the millions):

$$k_1 = \frac{\log\left(1 - \frac{14.75}{80}\right)}{2 \cdot \log\left(1 - \frac{1}{80}\right)} = \frac{-0.0885}{-0.0109} = 8.12$$

$f\_pos_1 = \max(0, (8.12-8)) = 0.12$

For BF2, the number of bits (N) is 40M, the number of set bits in BF2 is 4M, and cnt2=2M. Thus, the false positive calculations for BF1 are as follows (with numbers in the millions):

$$k_2 = \frac{\log\left(1 - \frac{4}{40}\right)}{2 \cdot \log\left(1 - \frac{1}{40}\right)} = \frac{-0.0458}{-0.0220} = 2.08$$

$f\_pos_2 = \max(0, (2.08-2)) = 0.08$

For BF3, the number of bits (N) in BF3 is 26.7M and the number of set bits in BF3 is 1.15M, and cnt3=0.5M. Thus, the false positive calculations for BF1 are as follows (with numbers in the millions):

$$k_3 = \frac{\log\left(1 - \frac{1.15}{26.7}\right)}{2 \cdot \log\left(1 - \frac{1}{26.7}\right)} = \frac{-0.0191}{-0.0332} = 0.575$$

$f\_pos_3 = \max(0, (0.575-0.5)) = 0.075$

6.3. Using False Positive Data to Adjust Bloom Filter Counts

Using this information, instance 212 adjusts the counts calculated for each Bloom filter to account for the number of false positive errors encountered during filter population. Specifically, according to some embodiments, the count for each Bloom filter (index i), cnti, is corrected using the false positive errors estimated for the Bloom filter series as follows:

$cnti = cnti + f\_pos_i - f\_pos_{(i-1)}$

In other words, each counter is adjusted to add the number of false positive errors calculated for the associated Bloom filter (index i), i.e., values that were not counted for the Bloom filter because it was assumed that they were already included in the filter. Furthermore, values that were wrongly not added to the count for a Bloom filter affect the count for the downstream filter. Thus, according to some embodiments, the count for a given Bloom filter at index i is further adjusted to remove any false positives calculated for the Bloom filter just upstream from the filter (at index i−1), i.e., to remove the values that were (wrongly) added to the Bloom filter because they likely should have been added to the upstream filter. Continuing with the example false positive calculation above, the final cnt1=8M+0.12M=8.12M, the final cnt2=2M+0.08M−0.12M=1.96M, and the final cnt3=0.5M+0.075M−0.08M=0.495M.

Accordingly, after false positive correction, the estimated count of values having f1=8.12M−1.96M=6.16M, and the estimated count of values having f2=1.96M−0.495M=1.465M. According to some embodiments, these values are stored in memory, e.g., at computing device 210 and/or in persistent storage 220. According to some embodiments, these values are returned to database client application 252 as a response to the request for an approximate frequency histogram.

7. Example Test Cases

Test cases were run to illustrate the improved performance using generation of approximate frequency histograms. For example, in a low NDV test case, generation of an approximate frequency histogram operated faster than generation of an exact frequency histogram, and there was no difference in the frequency histograms generated by the two approaches.

For a high NDV test case, the exact frequency histogram generator aborted with an error unless the implementing query was run with an optimizer hint indicating that intermediate data for the query would be large. The time required for this approach to run increased significantly as the number of values approached 20M. In contrast, techniques for approximating the frequency histogram described herein required a small fraction of the runtime of the exact frequency histogram approach. With false positive correction, f1 errors were close to 0% and f2 errors were around −2.5% for 20M rows. Without false positive correction, for 20M rows, the f1 error was at about −2.5% and the f2 error was at 14.5%; the number of values having f2 was much smaller than the number of values having f1 (given the high NDV of the data), and the false positives being added to the f2 group from the f1 group caused the f1 estimate to be somewhat low, and caused a higher error in the f2 estimate because of the relatively small cardinality.

The improvement in speed affected by techniques for generating an approximate frequency histogram is more noticeable when multiple datasets are concurrently analyzed for frequency histogram data. For example, a set of tests were run to estimate the NDV of five columns from a particular very large table in order to predict a dictionary size for encoding values from the five columns.

When 1M rows were analyzed, there was no difference in the end-to-end dictionary size prediction accuracy (based on the resulting histograms), and the test case based on approximating frequency histograms had a 5× improvement in runtime over the test case based on exact frequency histograms. Further, when 10M rows were analyzed, there was a 0.8% difference between predicted dictionary sizes, and the test case based on approximating frequency histograms had a 9.2× improvement in runtime over the test case based on exact frequency histograms. In short, the dictionary size predictions from approximate frequency histograms were the same or similar as predictions based on exact frequency histograms with a performance improvement of 5× and 9.2×, caused by the faster estimation of f1 and f2 and the ability to estimate f1 and f2 with one pass over the table instead of five passes to analyze each column individually.

8. Database Overview

Embodiments described herein are used in the context of database management systems (DBMSs). Therefore, a description of an example DBMS is provided. Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines the totality of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle and MySQL. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Referring to FIG. 2, DBMS 240 comprises a computing device 210 running a database server instance 212, and a database 222 in persistent storage 220. DBMS 240 may correspond to various types of database systems, such as a clustered database system and/or a multi-tenant database system. Database 222 includes database object 224, with columns 226A-N, where the label "N" connotes that any number of elements, items, or sets of items may be present or used in embodiments, as in "1 to N items". Data from database 222 may reside in volatile and/or non-volatile storage, such as memory of computing device 210 and persistent storage 220. Thus, database 222 may include a virtual disk and/or a set of physical disks. Additionally or alternatively, database 222 may be stored, at least in part, in main memory of a computing device.

A single-node DBMS, such as example DBMS 240, comprises a single node that runs a database server instance that accesses and manages the database. However, embodiments may be implemented on a multi-node database management system, which is made up of interconnected nodes that share access to the same database. Typically, the nodes are interconnected via a network and share access, in varying degrees, to shared storage, e.g., shared access to a set of disk drives and data blocks stored thereon represented, in FIG. 2, as persistent storage 220. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack. In such a system, the various aspects of DBMS 240, e.g., the components that are depicted as residing on computing device 210, may be implemented on another node.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

8.1. Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

8.2. Query Optimization

As used herein, a query is considered "transformed" when the query is (a) rewritten from a first expression or representation to a second expression or representation, (b) received in a manner that specifies or indicates a first set of operations, such as a first expression, representation, or execution plan, and executed using a second set of operations, such as the operations specified by or indicated by a second expression, representation, or execution plan, or (c) received in a manner that specifies or indicates a first set of operations, and planned for execution using a second set of operations.

Two queries or execution plans are semantically equivalent to each other when the two queries or execution plans, if executed, would produce equivalent result sets, even if the result sets are assembled in different manners by the two queries or execution plans. Execution of a query is semantically equivalent to a query or execution plan if the query execution produces a result set that is equivalent to the one that would be produced by that query or execution plan, if executed.

A query optimizer may optimize a query by transforming the query. In general, transforming a query involves rewriting a query into another query that produces the same result and that can potentially be executed more efficiently, i.e., one for which a potentially more efficient and/or less costly execution plan can be generated. A query may be rewritten by manipulating any internal representation of the query, including any copy thereof, to form a transformed query or a transformed query representation. Alternatively and/or in addition, a query may be rewritten by generating a different but semantically equivalent database statement.

9. Hardware Overview

An application, such as database client application 252 or instance 212, runs on a computing device and comprises a combination of software and allocation of resources from the computing device. Specifically, an application is a combination of integrated software components and an allocation of computational resources, such as memory, and/or processes on the computing device for executing the integrated software components on a processor, the combination of the software and computational resources being dedicated to performing the stated functions of the application.

One or more of the functions attributed to any process described herein, may be performed any other logical entity that may or may not be depicted in FIG. 2, according to one or more embodiments. In some embodiments, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
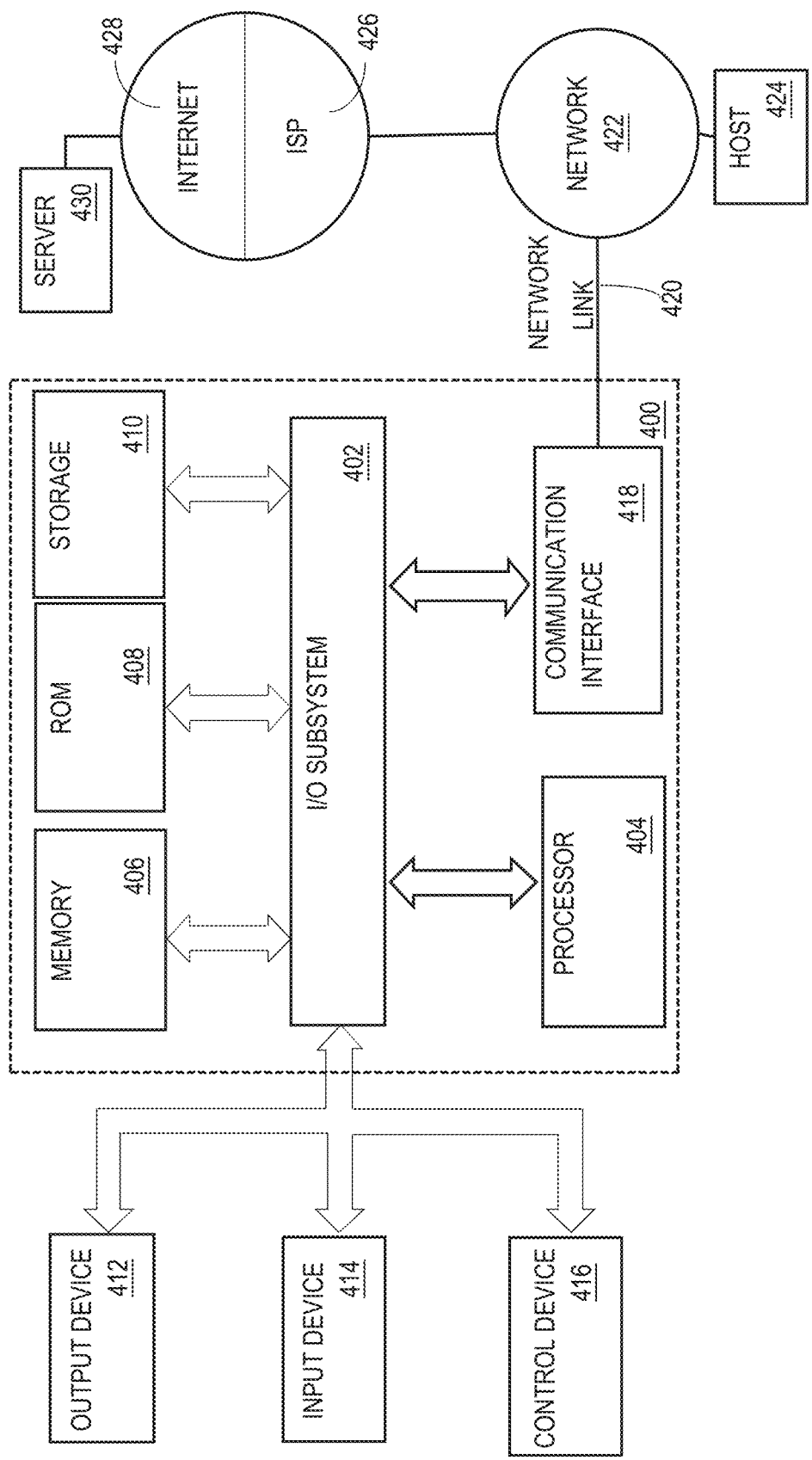
FIG. 4 is a block diagram that illustrates a computer system upon which some embodiments may be implemented.

For example, FIG. 4 is a block diagram that illustrates a computer system 400 upon which some embodiments described herein may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
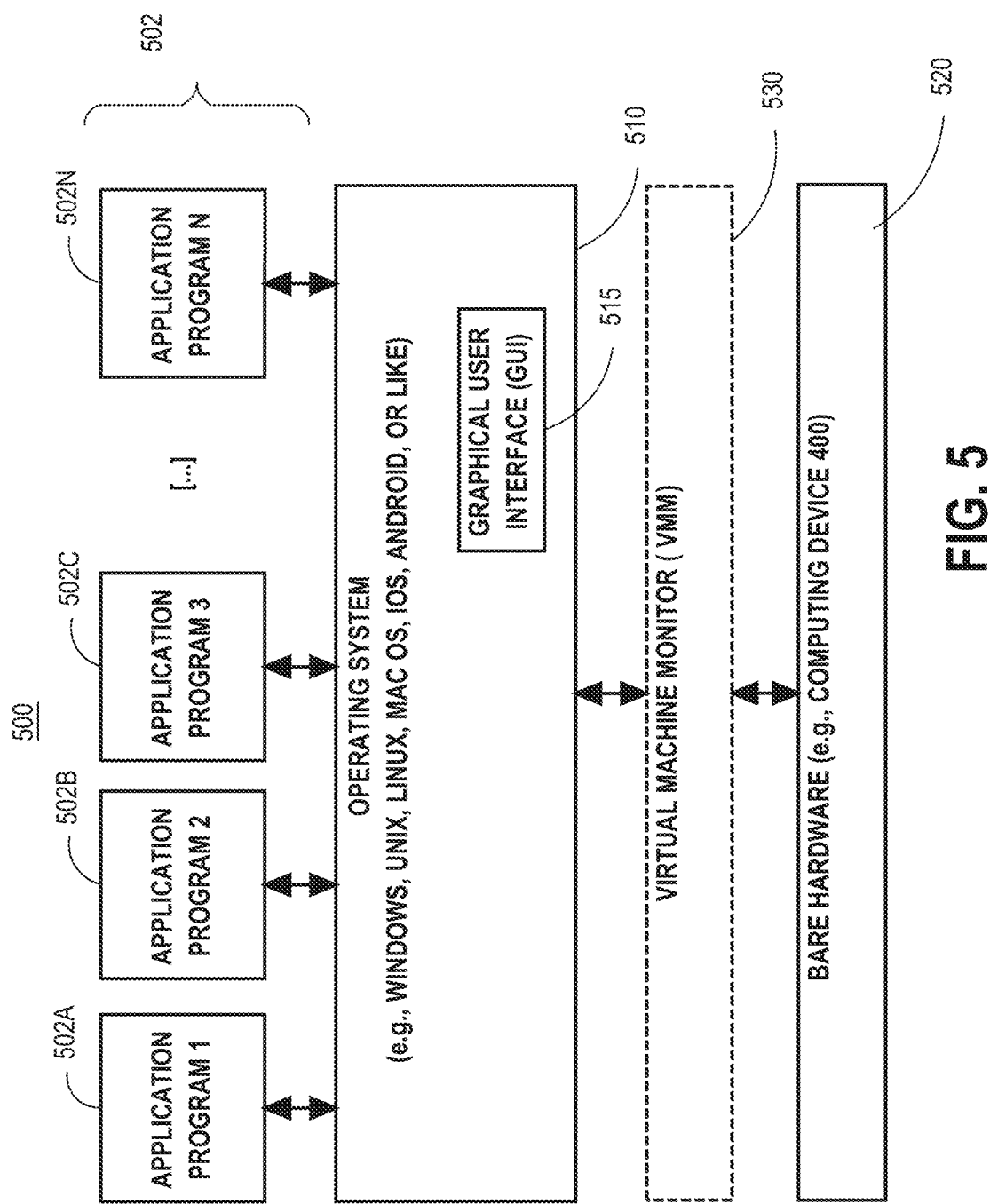
FIG. 5 is a block diagram of a basic software system that may be employed for controlling the operation of a computer system.

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments described herein have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
gathering estimated value frequency data for values of a target dataset by, for each value in the target dataset:
determining whether said each value is represented in a first Bloom filter;
responsive to determining said each value is not represented in the first Bloom filter: (a) representing said each value within the first Bloom filter, and (b) incrementing a first counter associated with the first Bloom filter;
responsive to determining that said each value is represented in the first Bloom filter:
determining whether said each value is represented in a second Bloom filter, and
responsive to determining that said each value is not represented in the second Bloom filter: (a) representing said each value within the second Bloom filter, and (b) incrementing a second counter associated with the second Bloom filter;
determining an estimated number of distinct values in the target dataset having a frequency of one (f1) based on subtracting a value of the second counter from a value of the first counter; and
storing, in memory, the estimated number of distinct f1 values;
wherein the method is performed by one or more computing devices.

2. The computer-executed method of claim 1, further comprising:
receiving a request to estimate a number of distinct values in the target dataset;
wherein determining the estimated number of distinct f1 values is performed in response to receiving the request;
returning the estimated number of distinct f1 values as a response to the request.

3. The computer-executed method of claim 1, wherein said gathering estimated value frequency data for values of the target dataset further comprises, for each value in the target dataset:
- responsive to determining that said each value is represented in the second Bloom filter:
  - determining whether said each value is represented in a third Bloom filter, and
  - responsive to determining that said each value is not represented in the third Bloom filter: (a) representing said each value within the third Bloom filter, and (b) incrementing a third counter associated with the third Bloom filter;

the method further comprises determining an estimated number of distinct values in the target dataset having a frequency of two (f2) based on subtracting a value of the third counter from a value of the second counter; and storing, in memory, the estimated number of distinct f2 values.

4. The computer-executed method of claim 3, wherein:
said target dataset has a particular row cardinality;
the method further comprises:
- allocating memory for the first Bloom filter based on the particular row cardinality;
- allocating memory for the second Bloom filter based on half of the particular row cardinality; and
- allocating memory for the third Bloom filter based on one-third of the particular row cardinality.

5. The computer-executed method of claim 1, wherein:
a set of filters comprises the first Bloom filter and the second Bloom filter; and
the method further comprises, after said gathering estimated value frequency data for values of the target dataset:
- for each Bloom filter of the set of filters, calculating a number of false positives for said each Bloom filter based, at least in part, on:
  - a value of the counter associated with said each Bloom filter,
  - a total number of bits in said each Bloom filter, and
  - a number of set bits in said each Bloom filter.

6. The computer-executed method of claim 5, wherein:
an ordered series of filters comprises the first Bloom filter and the second Bloom filter, in order; and
the method further comprises:
- for each Bloom filter of the ordered series of filters, adding, to a counter associated with said each Bloom filter, the number of false positives calculated for said each Bloom filter; and
- for each Bloom filter of the ordered series of filters other than the first filter of the ordered series of filters, subtracting, from the counter associated with said each Bloom filter, a second number of false positives calculated for a previous Bloom filter within the ordered series of filters.

7. The computer-executed method of claim 1, further comprising gathering estimated value frequency data for values of one or more other datasets concurrently with said gathering estimated value frequency data for values of the target dataset.

8. The computer-executed method of claim 7, wherein:
a data structure storing the target dataset includes the one or more other datasets;
each value of the target dataset is in a target column of a respective distinct row of a plurality of rows in the data structure;
wherein each row, of the plurality of rows, further comprises one or more other columns storing values for the one or more other datasets; and
said gathering estimated value frequency data for values of the one or more other columns concurrently with said gathering estimated value frequency data for values of the target column in a particular table comprises obtaining values, from each row of the plurality of rows, for the target column and for the one or more other columns.

9. The computer-executed method of claim 1, further comprising estimating a number of distinct values based, at least in part, on the estimated number of distinct f1 values.

10. The computer-executed method of claim 9, wherein:
the target dataset comprises a sample of less than all values in a parent dataset; and
said estimating the number of distinct values results in an estimate of the number of distinct values in the parent dataset.

11. One or more non-transitory computer-readable media storing one or more sequences of instructions that, when executed by one or more processors, cause:
gathering estimated value frequency data for values of a target dataset by, for each value in the target dataset:
- determining whether said each value is represented in a first Bloom filter;
- responsive to determining said each value is not represented in the first Bloom filter: (a) representing said each value within the first Bloom filter, and (b) incrementing a first counter associated with the first Bloom filter;
- responsive to determining that said each value is represented in the first Bloom filter:
  - determining whether said each value is represented in a second Bloom filter, and
  - responsive to determining that said each value is not represented in the second Bloom filter: (a) representing said each value within the second Bloom filter, and (b) incrementing a second counter associated with the second Bloom filter;

determining an estimated number of distinct values in the target dataset having a frequency of one (f1) based on subtracting a value of the second counter from a value of the first counter; and storing, in memory, the estimated number of distinct f1 values.

12. The one or more non-transitory computer-readable media of claim 11, wherein the one or more sequences of instructions further comprise instructions that, when executed by one or more processors, cause:
receiving a request to estimate a number of distinct values in the target dataset;
wherein determining the estimated number of distinct f1 values is performed in response to receiving the request;
returning the estimated number of distinct f1 values as a response to the request.

13. The one or more non-transitory computer-readable media of claim 11, wherein said gathering estimated value frequency data for values of the target dataset further comprises, for each value in the target dataset:
- responsive to determining that said each value is represented in the second Bloom filter:
  - determining whether said each value is represented in a third Bloom filter, and
  - responsive to determining that said each value is not represented in the third Bloom filter: (a) representing said each value within the third Bloom filter, and (b) incrementing a third counter associated with the third Bloom filter;

the one or more sequences of instructions further comprise instructions that, when executed by one or more processors, cause determining an estimated number of distinct values in the target dataset having a frequency of two (f2) based on subtracting a value of the third counter from a value of the second counter; and storing, in memory, the estimated number of distinct f2 values.

14. The one or more non-transitory computer-readable media of claim 13, wherein:

said target dataset has a particular row cardinality;

the one or more sequences of instructions further comprise instructions that, when executed by one or more processors, cause:

allocating memory for the first Bloom filter based on the particular row cardinality;

allocating memory for the second Bloom filter based on half of the particular row cardinality; and allocating memory for the third Bloom filter based on one-third of the particular row cardinality.

15. The one or more non-transitory computer-readable media of claim 11, wherein:

a set of filters comprises the first Bloom filter and the second Bloom filter; and the one or more sequences of instructions further comprise instructions that, when executed by one or more processors, cause, after said gathering estimated value frequency data for values of the target dataset:

for each Bloom filter of the set of filters, calculating a number of false positives for said each Bloom filter based, at least in part, on:

a value of the counter associated with said each Bloom filter, a total number of bits in said each Bloom filter, and a number of set bits in said each Bloom filter.

16. The one or more non-transitory computer-readable media of claim 15, wherein:

an ordered series of filters comprises the first Bloom filter and the second Bloom filter, in order; and the one or more sequences of instructions further comprise instructions that, when executed by one or more processors, cause:

for each Bloom filter of the ordered series of filters, adding, to a counter associated with said each Bloom filter, the number of false positives calculated for said each Bloom filter; and for each Bloom filter of the ordered series of filters other than the first filter of the ordered series of filters, subtracting, from the counter associated with said each Bloom filter, a second number of false positives calculated for a previous Bloom filter within the ordered series of filters.

17. The one or more non-transitory computer-readable media of claim 11, wherein the one or more sequences of instructions further comprise instructions that, when executed by one or more processors, cause gathering estimated value frequency data for values of one or more other datasets concurrently with said gathering estimated value frequency data for values of the target dataset.

18. The one or more non-transitory computer-readable media of claim 17, wherein:

a data structure storing the target dataset includes the one or more other datasets;

each value of the target dataset is in a target column of a respective distinct row of a plurality of rows in the data structure;

wherein each row, of the plurality of rows, further comprises one or more other columns storing values for the one or more other datasets; and said gathering estimated value frequency data for values of the one or more other columns concurrently with said gathering estimated value frequency data for values of the target column in a particular table comprises obtaining values, from each row of the plurality of rows, for the target column and for the one or more other columns.

19. The one or more non-transitory computer-readable media of claim 11, wherein the one or more sequences of instructions further comprise instructions that, when executed by one or more processors, cause estimating a number of distinct values based, at least in part, on the estimated number of distinct f1 values.

20. The one or more non-transitory computer-readable media of claim 19, wherein:

the target dataset comprises a sample of less than all values in a parent dataset; and said estimating the number of distinct values results in an estimate of the number of distinct values in the parent dataset.

* * * * *